Figure 1:
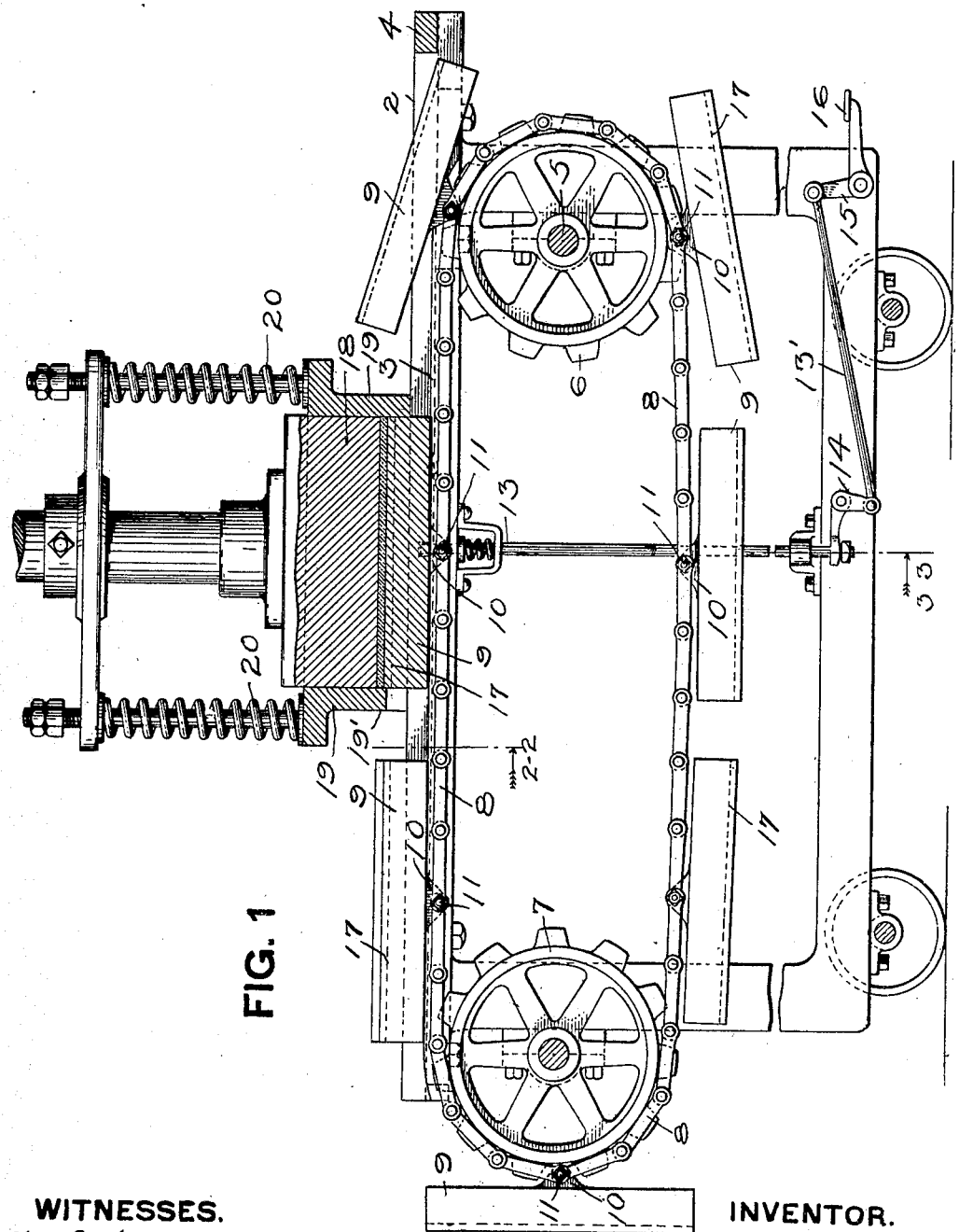

W. L. MOONEY.
PRESSING GLASS TILES.
APPLICATION FILED DEC. 28, 1907.

916,574.

Patented Mar. 30, 1909.
2 SHEETS—SHEET 1.

WITNESSES.

INVENTOR.

W. L. MOONEY.
PRESSING GLASS TILES.
APPLICATION FILED DEC. 28, 1907.
916,574.
Patented Mar. 30, 1909.
2 SHEETS—SHEET 2.
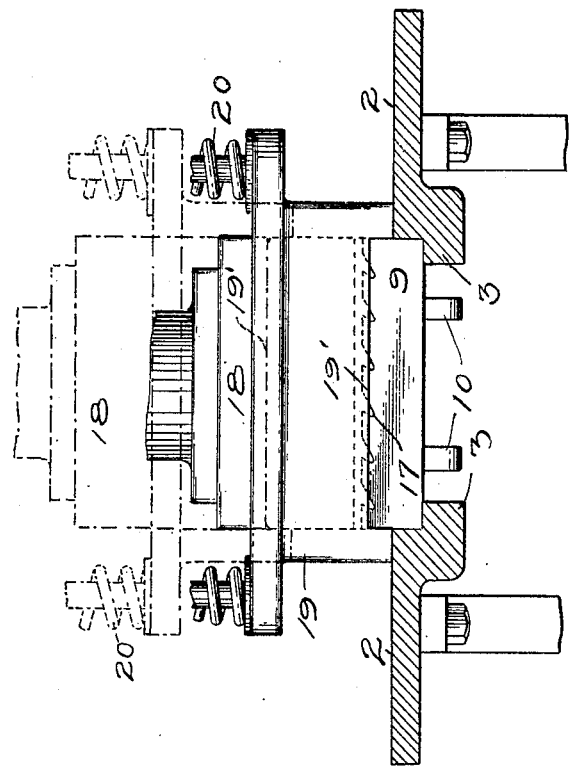
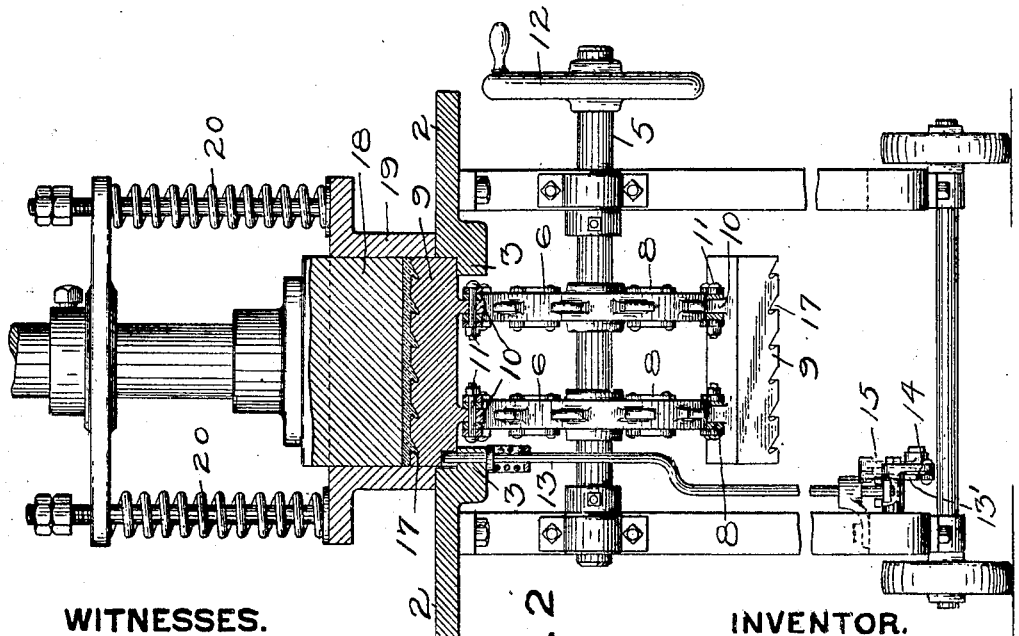

UNITED STATES PATENT OFFICE.

WILLIAM L. MOONEY, OF WESTON, WEST VIRGINIA.

PRESSING GLASS TILES.

No. 916,574.  Specification of Letters Patent.  Patented March 30, 1909.

Application filed December 28, 1907. Serial No. 408,348.

*To all whom it may concern:*

Be it known that I, WILLIAM L. MOONEY, a resident of Weston, in the county of Lewis and State of West Virginia, have invented certain new and useful Improvements in Pressing Glass Tiles, of which the following is a specification.

One object of this invention is to provide a tile press having an endless series of tile molds which are brought successively into pressing position beneath the plunger.

A further object is to provide the plunger with a depending mold-embracing rim, with a rim stop (which is preferably the mold table) for limiting the downward movement of the rim.

Another feature of the invention is the spring-depressed rim closely fitting and movable on the plunger and closely fitting around the mold, whereby the press operator may manipulate the plunger in the manner peculiar to the art of a presser for securing tiles of perfect formation.

Still a further purpose is to so construct the mold-embracing plunger-rim as not to close the rib-forming grooves so that an outlet is afforded for the excess glass.

In the accompanying drawings, Figure 1 is a side elevation, partly in section of a portion of pressing apparatus embodying the invention, and Figs. 2 and 3 are vertical cross-sectional views on lines 2—2 and 3—3, respectively, of Fig. 1.

Referring to the drawings, the table of the machine is open between its longitudinal side portions 2, with longitudinal parallel shoulders 3 at the inner faces thereof, and with the sides preferably connected or closed together at the front end of the table at 4. Journaled beneath the top of the table at the front end is shaft 5 carrying sprocket wheels 6, while at or adjacent the opposite end of the table are similar sprockets 7, with the parallel carrier-forming chains 8 extending around the sprockets.

9 are the tile molds secured to the chains, preferably by the central lugs 10 and pivots 11, whereby the molds move readily around the sprocket wheels. The interior space of the table at the front end is sufficient to permit the molds to pass upwardly therethrough and onto shoulders 3 on which they slide. The molds closely fit the space between sides 2 above the shoulders, and the latter firmly support the same. The carrier may be moved by crank 12 on shaft 5, or in any other suitable manner. A spring-raised pin 13, moving vertically through the table, may engage a depression in the bottom of each mold as it comes to pressing position and hold it in accurate position for the pressing operation. Rod 13 may be connected by levers 14 and 15 to treadle 16 for depressing the locking pin and releasing the molds. The molds stand above table 2, and the top face of each corresponds in outline to the tile to be pressed, with downwardly tapering rib-forming grooves 17 depressed therein from end to end.

The plunger 18 has a bottom or pressing face of the same outline as the mold top, and carried by and depending from the plunger is rim 19 which closely embraces the upper portion of the mold alined therewith and rests on the table when the plunger is in pressing position, the table being in effect a stop for limiting the downward movement of the rim. I preferably construct the rim to move vertically on the plunger with springs 20 holding it normally depressed. When pressing, the plunger is lowered farther than rim 19, and hence is moved downward therein, or the rim is raised thereon, against the pressure of springs 20. The rim is thus held tightly seated on the table and as it closely fits around the plunger and mold, a perfect tile is produced.

End 19' of rim 19 is of less depth than the remainder of the rim so as to stand above the bottom of rib-forming grooves 17 when the rim is seated, whereby any excess glass may discharge from the mold during the pressing operation, and as such discharge occurs from points other than the face and side edges of the tile body, the latter is in no way marred, the excess glass being simply cracked off from the rib ends.

After a tile has been pressed and the plunger raised, the carrier is advanced to place another mold beneath the plunger while the tile last pressed is removed from its mold then located adjacent the rear end of the table and placed in the annealing oven.

With the plunger mechanism constructed as here shown, the skill of the presser may be exercised in the pressing of each tile, and a uniformly high grade of ware produced.

No means is here shown for operating the plunger, as the same may be constructed in accordance with any of the well known press operating mechanisms.

While I have here shown the mold and plunger operating in connection with an endless conveyer and a mold table of particular form, the invention is not thus restricted.

I claim:—

1. A tile press comprising a mold, a vertically movable plunger, a spring-depressed rim surrounding the plunger and depending therefrom and normally moving therewith, the rim being of a size to fit around the mold when the plunger and rim are lowered, and means for stopping the downward movement of the rim while in mold surrounding position before the plunger is fully lowered, the plunger completing its movement by lowering within the rim.

2. A tile press comprising a mold, a mold support, a vertically movable plunger, a spring-depressed rim surrounding the plunger and depending therefrom and normally moving therewith, the rim being of a size to fit around the mold when the plunger and rim are lowered, the downward movement of the rim being arrested by the mold support which it engages before the plunger is fully lowered, the plunger completing its movement by lowering within the rim.

3. A tile press comprising a mold with rib-forming grooves in the top face thereof and at one end opening through a vertical face of the mold, a plunger, and a rim depending from the plunger and closely embracing the mold, the portion of the rim at the mold-face through which the grooves open stopping short of the bottom of the grooves when the plunger is in pressing position.

4. A tile press comprising a mold having rib-forming grooves in the top face thereof opening through a vertical face of the mold, a rim stop beneath the top face of the mold, a plunger, a rim depending from the plunger and embracing the mold and resting on the rim stop, the portion of the rim at the open ends of the grooves stopping short of the groove bottoms when the plunger is in pressing position.

5. A tile press comprising a mold having rib-forming grooves in the top face thereof, a rim stop beneath the top of the mold, a plunger, and a vertically movable spring-depressed rim fitting around the plunger and depending therefrom and embracing the mold, the rim raised from normal position and resting on the rim-stop when the plunger is in pressing position.

6. A tile press comprising a mold having rib-forming grooves in the top face thereof opening through a vertical face of the mold, a rim stop beneath the top of the mold, a plunger, and a vertically movable spring-depressed rim fitting around the plunger and depending therefrom and embracing the mold with the portion of the rim at the open ends of the grooves stopping short of the groove-bottoms, the rim being moved upwardly on the plunger and resting on the rim-stop when the plunger is in pressing position.

7. A tile press comprising a table having a top depression, a mold within and rising above the depression with rib forming grooves in the top face thereof, the grooves opening through a side face of the mold, a plunger, a spring-depressed rim movable vertically on the plunger and depending therefrom, the rim resting on the table and embracing the mold and raised on the plunger when the latter is in pressing position, the portion of the rim at the open ends of the grooves stopping short of the groove-bottoms when the rim is thus seated.

In testimony whereof I affix my signature in presence of two witness.

WILLIAM L. MOONEY.

Witnesses:
RALPH KITSON,
E. D. MOONEY.